US008339388B2

(12) United States Patent
Rivet et al.

(10) Patent No.: US 8,339,388 B2
(45) Date of Patent: Dec. 25, 2012

(54) CONTROLLING AN ENERGY RECOVERY STAGE OF A PLASMA SCREEN

(75) Inventors: Bertrand Rivet, Vouvray (FR); Frédéric Gautier, Monnaie (FR); Benoit Peron, Tours (FR)

(73) Assignee: STMicroelectronics S.A., Montrouge (FR)

( * ) Notice: Subject to any disclaimer, the term of this patent is extended or adjusted under 35 U.S.C. 154(b) by 643 days.

(21) Appl. No.: 12/094,004

(22) PCT Filed: Nov. 17, 2006

(86) PCT No.: PCT/FR2006/051189

§ 371 (c)(1), (2), (4) Date: Nov. 14, 2008

(87) PCT Pub. No.: WO2007/057616

PCT Pub. Date: May 24, 2007

(65) Prior Publication Data

US 2009/0141014 A1 Jun. 4, 2009

(30) Foreign Application Priority Data

Nov. 18, 2005 (FR) ..................................... 05 53511

(51) Int. Cl.
*G06F 3/08* (2006.01)
*G09G 5/00* (2006.01)

(52) U.S. Cl. .............. 345/211; 345/42; 345/60; 345/62; 345/68; 345/204; 313/169.3; 313/169.4

(58) Field of Classification Search .................... 345/42, 345/60, 62, 68, 204, 211; 313/169.3, 169.4
See application file for complete search history.

(56) References Cited

U.S. PATENT DOCUMENTS 6,396,674 B1 * 5/2002 Chen et al. .................. 361/93.7
6,407,725 B1 * 6/2002 Song .............................. 345/60
6,686,912 B1 2/2004 Kishi et al.
2004/0085263 A1 * 5/2004 Lee et al. ........................ 345/41
2005/0012689 A1 * 1/2005 Abdoulin ........................ 345/60

OTHER PUBLICATIONS

International Search Report from corresponding International Application No. PCT/FR2006/051189, filed Nov. 17, 2006, Search performed Jul. 5, 2007.

* cited by examiner

*Primary Examiner* — Alexander S Beck
*Assistant Examiner* — Tony N Ngo
(74) *Attorney, Agent, or Firm* — Wolf, Greenfield & Sacks, P.C.

(57) ABSTRACT

A method and a circuit for controlling a power recovery stage of a plasma display panel including a resonant circuit of at least one inductive element and one capacitive element, wherein the capacitive element is precharged to half a supply voltage of the display panel.

17 Claims, 4 Drawing Sheets

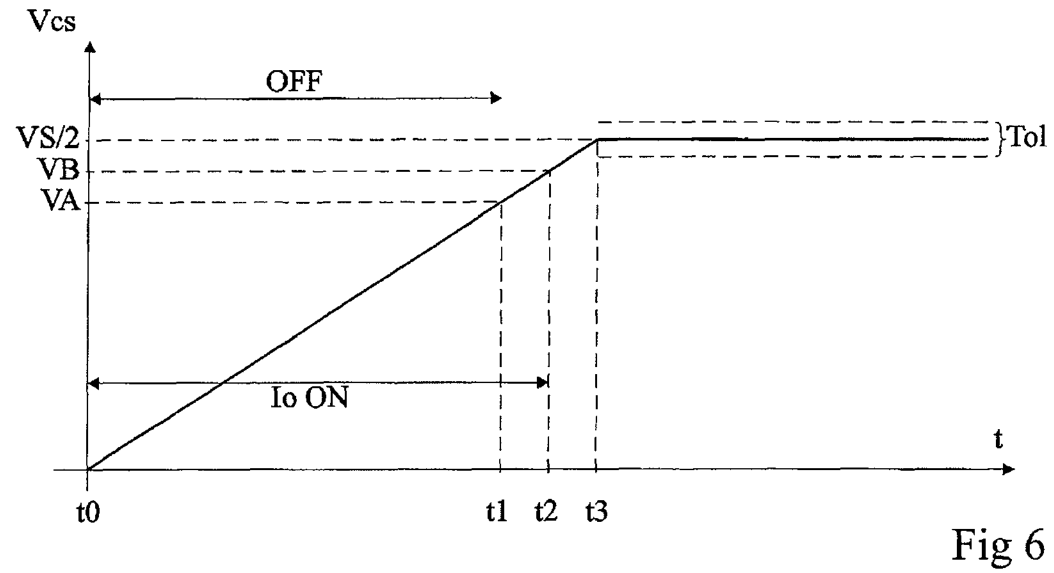
Fig 6
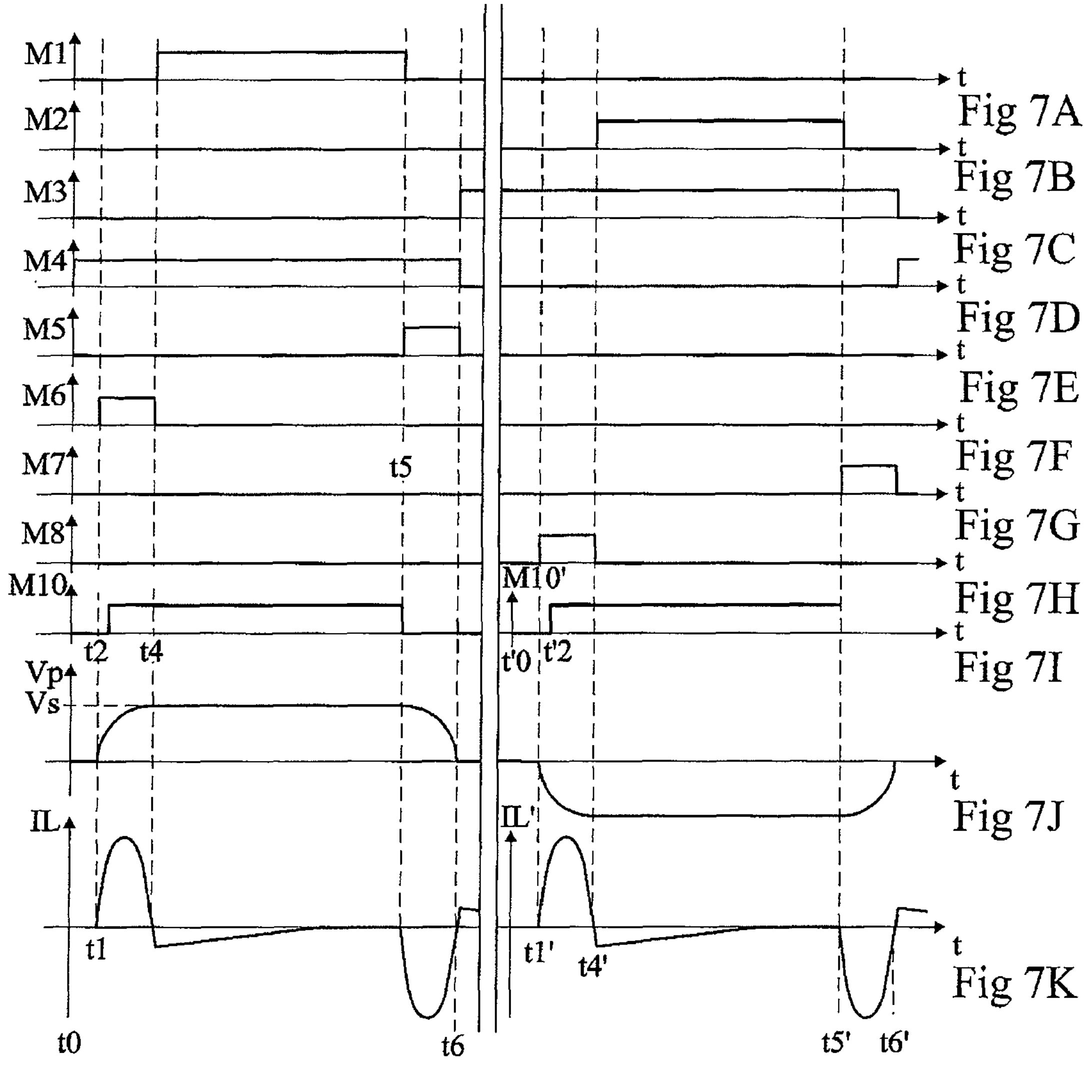
Fig 7A
Fig 7B
Fig 7C
Fig 7D
Fig 7E
Fig 7F
Fig 7G
Fig 7H
Fig 7I
Fig 7J
Fig 7K

CONTROLLING AN ENERGY RECOVERY STAGE OF A PLASMA SCREEN

FIELD OF THE INVENTION

The present invention generally relates to plasma display panels which comprise two parallel plates each supporting two electrode networks and between which is present a gas originating from light discharges at regions of intersection between the electrodes of the different plates.

The present invention more specifically relates to the control of the electrode networks of the screen in a so-called sustain phase in which the electrodes of each network are excited by an A.C. voltage.

DISCUSSION OF THE RELATED ART

FIG. 1 generally and very schematically shows the structure of a plasma display panel 1 (PDP) of the type to which the present invention applies. Two parallel plates designated with general reference numeral 2 each support electrodes generally perpendicular from one plate to the other and parallel to each other on a same plate. Each line L of the screen is defined by two parallel electrodes 3 and 4 and each column C of the screen is defined by an electrode 5 in the other direction, supported by the other plate. The intersection of a line L and of a column C defines a pixel P of the screen. For the lighting of a pixel, a light discharge is organized between electrodes 3 and 4 of a line L, addressed by the corresponding column 5.

The control of screen 2 is performed by means of a circuit 6 for driving column electrodes (COL DRV) and circuits 7 for driving a first network of so-called scan line electrodes (for example, 3) (SCAN DRV). Circuit 7 is connected to a first power supply circuit 8 (PW CT). The second network of so-called line sustain electrodes (for example, 4) is directly connected to a circuit 8' of power supply (PW REF) (generally, a reference voltage). Circuits 6, 7, 8, and 8' are controlled and synchronized by a unit 9 (CU), generally a calculator or a circuit in wired logic.

The present invention more specifically relates to a portion of power supply circuits 8, 8'.

FIG. 2 very schematically shows in the form of blocks a conventional example of architecture of circuits 8 and 8' associated with the control circuits of the scan and sustain electrodes of the type to which the present invention applies. In FIG. 2, two lines 3 and 4 of the display panel have been symbolized by their equivalent capacitor having its two electrodes respectively connected to scan circuit 7 and to power supply circuit 8'. Typically, the control circuits of each scan electrode (contained in block 7) are formed of switches operating in an on/off manner to bring, onto one of the electrodes of the considered line, different voltage levels in different operating phases. For simplification, the different control signals have not been illustrated in the drawings. In practice, each scan electrode is associated with several switches of circuit 7 which are used to select that of the screen lines which will receive the different voltages. All the control circuits of the different electrodes have their respective power supply terminals interconnected to common power supply circuit 8.

Circuit 8 on the scan electrode side comprises an addressing stage 11 (ADD/ER) in charge of bringing an addressing voltage to electrodes selected by control circuit 7. Addressing stage 11 may be completed by an erasing stage at a different voltage. Circuit 8 also comprises an electrode pre-bias or precharge stage 12 (BIAS). It further comprises a power recovery stage 13 (PR) to which the present invention more specifically applies, intended to impose a voltage on electrodes 3 by carrying off excess charges or by bringing missing charges during the so-called sustain operating phase.

On the sustain electrode side, circuit 8' amounts to a power recovery stage 13' identical to stage 13 on the scan electrode stage, to which are interconnected all lines 4.

FIG. 3 very schematically shows a conventional example of power recovery stages 13 and 13' of the type to which the present invention applies, connected to a panel 2 of electrodes 3 and 4 of a plasma screen. Electrode panel 2 has been symbolized by the different lines 3 and 4 between which equivalent line capacitors C1 have been shown. Panel 2, having all its scan electrodes 3 and respectively all its sustain electrodes 4 interconnected during the power recovery phase, is equivalent to a capacitance Cp. The interconnection of all the scan electrodes is performed by means of control circuit 7, and other switches in all or nothing of the pre-bias and addressing stages 12 and 11 (not shown in FIG. 3) respectively connect the then common terminal 23 of electrodes 3 to an access terminal 31 at stage 13. The interconnection of all sustain electrodes 4 is structural and their common terminal 24 is connected to an access terminal 31' of stage 13'.

Each stage 13 or 13' or so-called Weber-type power recovery circuit is intended to impose a voltage on terminal 23 or 24 by evacuating excess charges and by bringing to these electrodes missing charges during the sustain phase.

Stage 13 mainly comprises an inductive element L connecting, by a bi-directional switch 32, an electrode 33 of a capacitor Cs to terminal 31 connectable to the common terminal (during the power recovery phase) of electrodes 3. Output terminal 31 of stage 13 is connected by a switch M1 to a terminal 25 of application of a positive voltage Vs and, by a switch M3, to a terminal 26 of application of a reference voltage (typically, the ground). In practice, each switch M1 or M3 is in parallel with a diode (typically, the intrinsic diode of a MOS transistor forming the switch) having its anode connected to terminal 31, respectively 26. Switch 32 is typically formed of two switches M5, M6 in antiparallel and each in series with a diode D5, D6, respectively. The respective junction points of transistor M5 and of diode D5 and of transistor M6 and of diode D6 are connected to terminal 25 of application of positive supply voltage Vs and to ground terminal 25 by blocking diodes D1 and D2.

The same structure can be found on the side of circuit 13' where a bi-directional switch 32' connects an electrode 33' of a capacitor Cs' having its other electrode at the reference voltage to a first terminal of an inductive element L' having its other terminal connected to output terminal 31' of stage 13', connectable to common terminal 24 of electrodes 4. Terminal 31' is connectable to terminals 25 and 26 by switches M2 and M4 (typically, MOS transistors) and bi-directional switch 32' has the same structure as switch 32 of stage 13 (switches M7 and M8 in antiparallel and each in series with a diode D7 and D8 between inductance L' and terminal 33', the respective midpoints of the series connections being connected by blocking diodes D1' and D2' to terminal 25 and to ground 26).

Switches M1, M2, M3, M4 form an H bridge, switches M1 and M4 being intended to be turned on at the same time, the same holding true for switches M2 and M3.

An example of a circuit for driving a plasma display panel is described in International application WO03/102907.

The display panel control can be temporally divided in frames and in display sub-frames during which are present different operation phases. In each display sub-frame, a first so-called pre-bias or precharge phase uses stage 12 to excite the display panel cells to pre-excite the contained gas and thus lower the addressing voltage under which the discharge will be performed subsequently. During the pre-bias phase, the excitation is for example performed under a voltage on the order of 400 volts.

This pre-bias phase is followed by a so-called stabilization phase, then by an erasing phase aiming at bringing the scan and sustain electrodes to an erasing voltage, generally the ground. The erasing and pre-bias phases result in suppressing the charges to avoid unwanted lightings.

A so-called addressing phase which aims at bringing a corresponding addressing voltage of a given level on electrodes 3 according to the respective states of addressing transistors of circuits 7 can then be observed. The period during which the addressing level is applied to the electrodes depends on the rank of the line in the display panel.

This addressing phase is followed by the sustain phase to which the present invention more specifically applies. During this phase, a pulse train of constant duty cycle and of amplitude Vs (on the order of 200 volts) is applied onto terminal 23. Recovery stages 13 of electrodes 3, and 13' of electrodes 4, are used to ease the charge of electrodes 3 (respectively 4) to level Vs and ease the discharge of these same electrodes during respective low levels of the pulses. The turning on and off of the switches (M1, M4, M3, M2) are alternated at the rate of the pulses of level Vs to be applied onto terminals 31 and 31'. This results, under the effect of the resonance circuit formed of inductance L and of capacitor Cs, in the application of an A.C. voltage between the scan and sustain lines. Typically, the frequency of the pulse trains is on the order of from 200 to 250 kHz and the average frequency on an image sub-frame of the sustain periods ranges between 0 and 85 kHz.

During the sustain or power recovery phase, equivalent capacitor Cp of the display screen is alternately charged and discharged by the resonant circuits of the scan and sustain electrodes by exploiting a Vs/2 charge level of capacitors Cs and Cs'.

Each power recovery pulse starts with a turning-on of switches M6 and M4 to supply a current to inductance L and bring voltage Vp across electrodes 3 to voltage level Vs, followed by a resonance phase after which transistor M1 and transistor M4 of the H bridge are turned on, and is ended by a discharge phase by the turning-on of transistor M5 (transistor M4 remaining on), enabling disappearing of voltage Vp through resonant circuit L-Cs. The next pulse is performed on the side of sustain electrodes 4 (transistors M8, M3, then M2, M3, then M3, M7) and so on. The resonance phase is especially used to decrease losses in the transistors of the H bridge and ease the transition between levels to avoid the current peaks in the display panel.

At the beginning of the resonance phase, the blocking diodes D1 and D2 (respectively, D1' and D2') of the stage are used to carry off the latching current of diodes D5 and D6 (respectively D8 and D7) which block at the end of the charge or discharge phase, and to limit overvoltages to protect the switches.

A disadvantage of known circuits is that they require high-voltage components, especially for switches M5 and M6 and diodes D5 and D6. In practice, voltage Vs is on the order of 200 volts and each transistor M5 or M6 sees half this supply voltage when capacitor Cs is charged to value Vs/2. A problem is however posed at the beginning when capacitor Cs is discharged and where one of the two transistors (M5) and one of the diodes (D6) then sees a voltage on the order of 200 volts, which requires use of transistors and diodes that can withstand several hundreds of volts. This increases the size of the transistors and increases their losses.

Another problem is linked to a dissymmetry between the charge and discharge phases due to different impedances of switches M5 and M6.

Such problems can of course be encountered on the side of switches M7 and M8 and of diodes D7 and D8.

Another disadvantage is that the voltage Vp obtained between electrodes 3 and 4 at resonance is not equal to voltage Vs. This results in possible peaks on switchings.

Another disadvantage of known circuits is that the blocking diodes take a long time to carry off latching currents.

SUMMARY OF THE INVENTION

The present invention aims at overcoming all or part of the disadvantages of known plasma display panel control circuits.

The present invention more specifically aims at enabling use of lower-voltage components in power recovery circuits.

The present invention also aims at decreasing losses by enabling a decrease in the size of power recovery circuit control switches.

The present invention also aims at preserving the architecture of conventional circuits and, in particular, at requiring no modification of the other plasma display panel control stages.

The present invention aims at more rapidly evacuating recovery currents in the diodes of the bi-directional switches of power recovery circuits.

To achieve all or part of these objects, as well as others, the present invention provides a method for controlling a power recovery stage of a plasma display panel comprising a resonant circuit of at least one inductive element and one capacitive element, comprising at least one step of precharge of the capacitive element to half a supply voltage of the display panel.

According to an embodiment of the present invention, switches of activation of the power recovery stage are inhibited during the precharge step, at least until the voltage across the capacitive element has reached a first threshold depending on the supply voltage.

According to an embodiment of the present invention, the step of precharge of the capacitive element is inhibited when the voltage thereacross reaches a second threshold depending on the supply voltage greater than the first one.

According to an embodiment of the present invention, the precharge of the capacitive element is obtained by means of a controllable current source.

The present invention also provides a control circuit of a power recovery stage of a plasma display panel having a resonant circuit of at least one inductive element and at least one capacitive element, comprising:

a controllable current source between a terminal of application of a supply voltage and the capacitive element; and at least one first comparator for comparing the voltage across the capacitive element with respect to a first threshold to activate switching elements of the recovery circuit.

According to an embodiment of the present invention, a second comparator compares the voltage across the capacitive element with respect to a second threshold greater than the first one to control said current source.

The present invention also provides a power recovery stage of a plasma display panel comprising a resonant circuit of at least one capacitor in series with a bi-directional switch and at least one inductive element between the junction point of a first branch of an H bridge and the ground, said junction point being connected to first electrodes of the display panel and the bi-directional switch being formed of an antiparallel association of two switches, each in series with a diode.

According to an embodiment of the present invention, two blocking circuits each comprise a zener diode in series with a diode between the terminal of the inductance connected to the bidirectional switch and two terminals of application of the supply voltage.

The present invention also provides a plasma display panel.

BRIEF DESCRIPTION OF THE DRAWINGS

The foregoing objects, features, and advantages of the present invention, as well as others, will be discussed in detail in the following non-limiting description of specific embodiments in connection with the accompanying drawings, in which:

FIG. 6 illustrates, in a timing diagram, the operation of the circuit of FIG. 5;

FIGS. 7A, 7B, 7C, 7D, 7E, 7F, 7G, 7H, 7I, 7J, and 7K are timing diagrams illustrating the power recovery phase in a plasma display screen according to an embodiment of the present invention.

Figure 1:
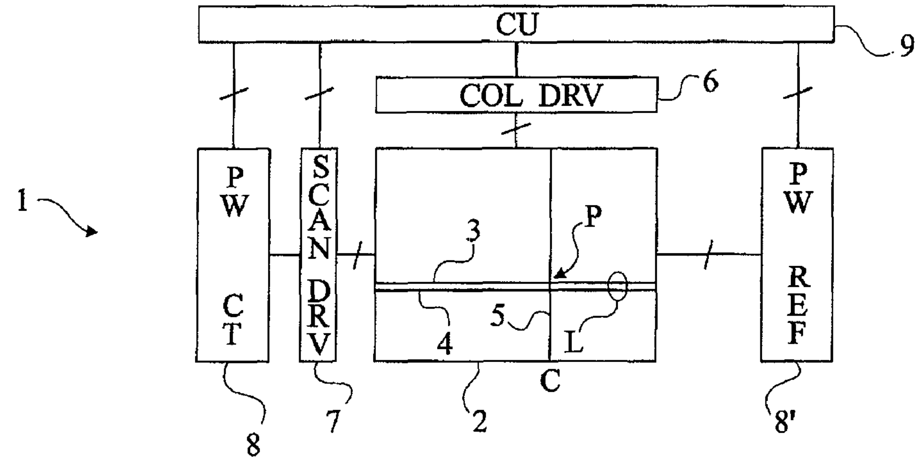
FIGS. 1 to 3, previously described, are intended to show the state of the art and the problem to solve.

The same elements have been designated with the same reference numerals in the different drawings and the timing diagrams have been drawn out of scale. For clarity, only those elements and operation steps which are useful to the understanding of the present invention have been shown in the drawings and will be described hereafter. In particular, the generation of the control signals adapted to the operation of the switches has not been described in detail, the present invention being compatible with the use of conventional circuits for generating such signals. Similarly, the full operation of a plasma display panel (especially, that of the other scan or sustain electrode control stages) has not been described in detail, the present invention being here again compatible with conventional systems.

DETAILED DESCRIPTION

A feature of an embodiment of the present invention is to precharge the capacitor of the resonant circuit of a Weber-type power recovery stage of a plasma display panel to half the supply voltage.

Figure 2:
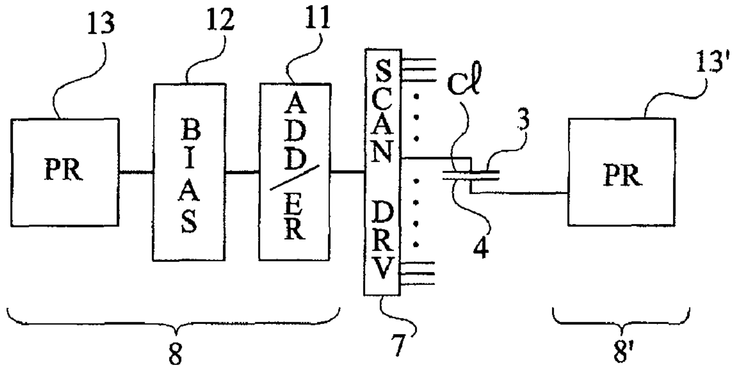
Figure 3:
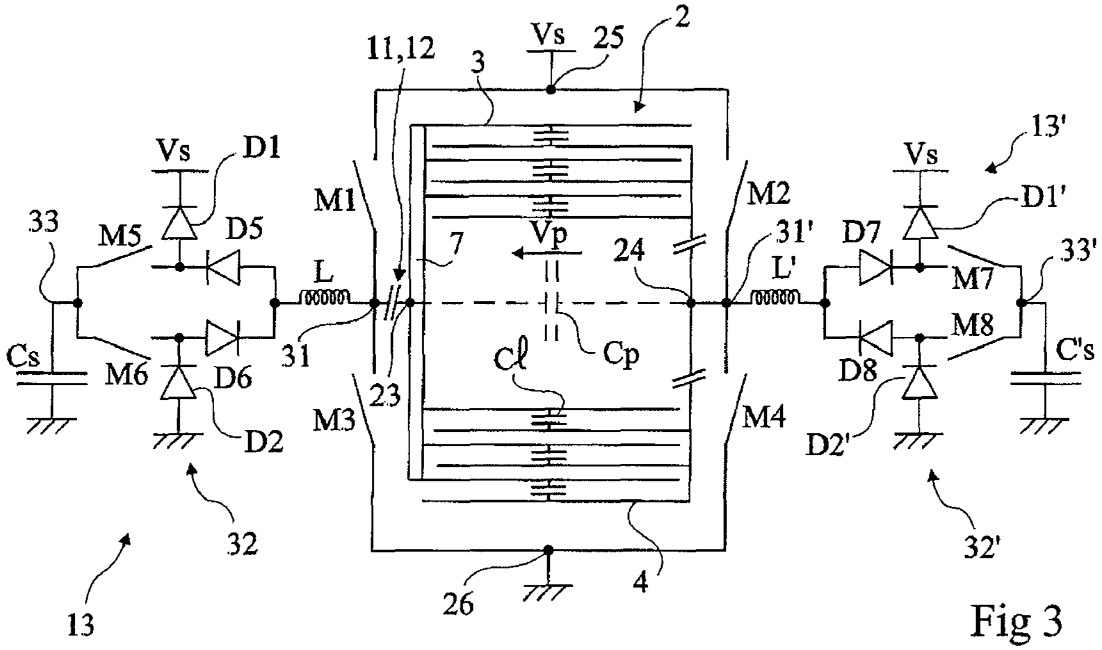
Figure 4:
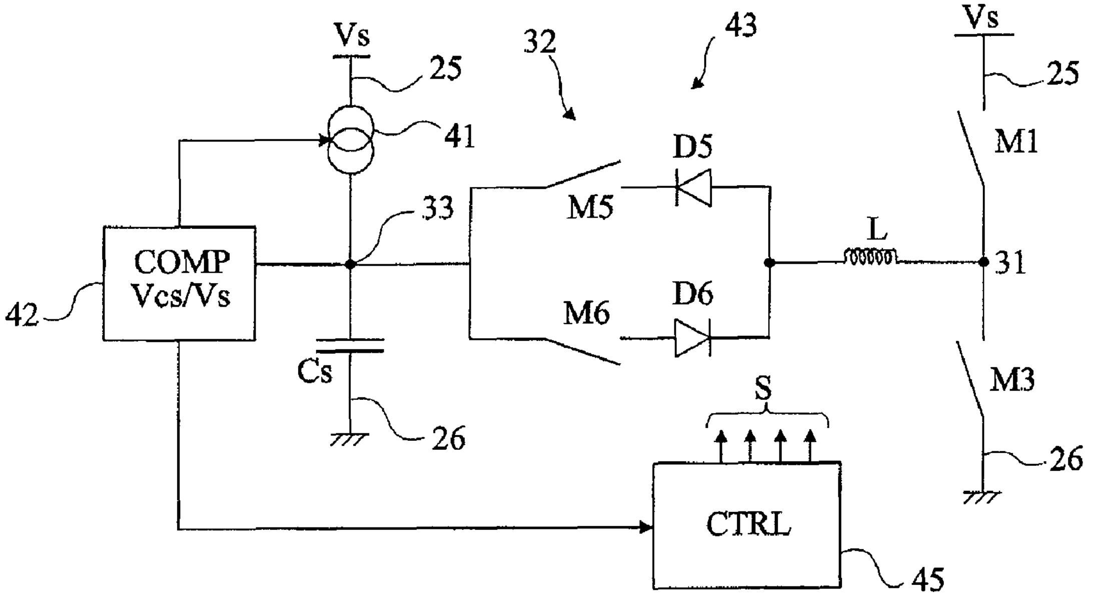
FIG. 4 very schematically shows in the form of blocks an embodiment of a power recovery circuit according to the present invention.

FIG. 4 very schematically shows in the form of blocks an embodiment of a power recovery stage 43 of a plasma display screen according to the present invention. For simplification, only one stage 43 on the scan electrode side (3, FIGS. 1, 2, and 3) has been shown. The other stage on the sustain electrode side has an identical structure.

The drawing shows inductance L and capacitor Cs forming the resonant circuit as well as bi-directional switch 32 formed of two MOS transistors M5 and M6 each in series with a diode D5, respectively D6, in antiparallel between an electrode 33 of capacitor Cs and a first electrode of inductance L. The other terminal of inductance L is connected to a terminal 31 forming a midpoint of a first branch of an H bridge connectable to the electrode panel (here, a first transistor M1 in series with a second transistor M2 between two terminals 25 and 26 of application of supply voltage Vs). For simplification, the blocking diodes (D1 and D2, FIG. 3) have not been shown.

The different switches are, for example, formed of MOS transistors which, according to a preferred embodiment of the present invention, are sized to withstand a voltage approximately equivalent to half the supply voltage Vs, plus a value corresponding to the expected voltage peaks, for example, on the order of from 10 to 15% of voltage Vs.

According to the embodiment shown in FIG. 4, electrode 33 of capacitor Cs is connected to terminal 25 of application of voltage Vs by a controllable current source 41. Source 41 is connected by a circuit 42 (COMP Vcs/Vs) of comparison of voltage Vcs across capacitor Cs with respect to at least one threshold depending on supply voltage Vs. The function of circuit 42 is to activate current source 41 only during starting periods when a precharge of capacitor Cs is required. This functionality will be subsequently detailed in relation with FIG. 5.

Switches M1, M2, M5, and M6 (as well as the switches of the other portion of the H bridge (M2, M4, FIG. 3)) are controlled in synchronized fashion by a circuit 45 (CTRL) having outputs S connected to the control terminals (gates) of the different switches.

Figure 5:
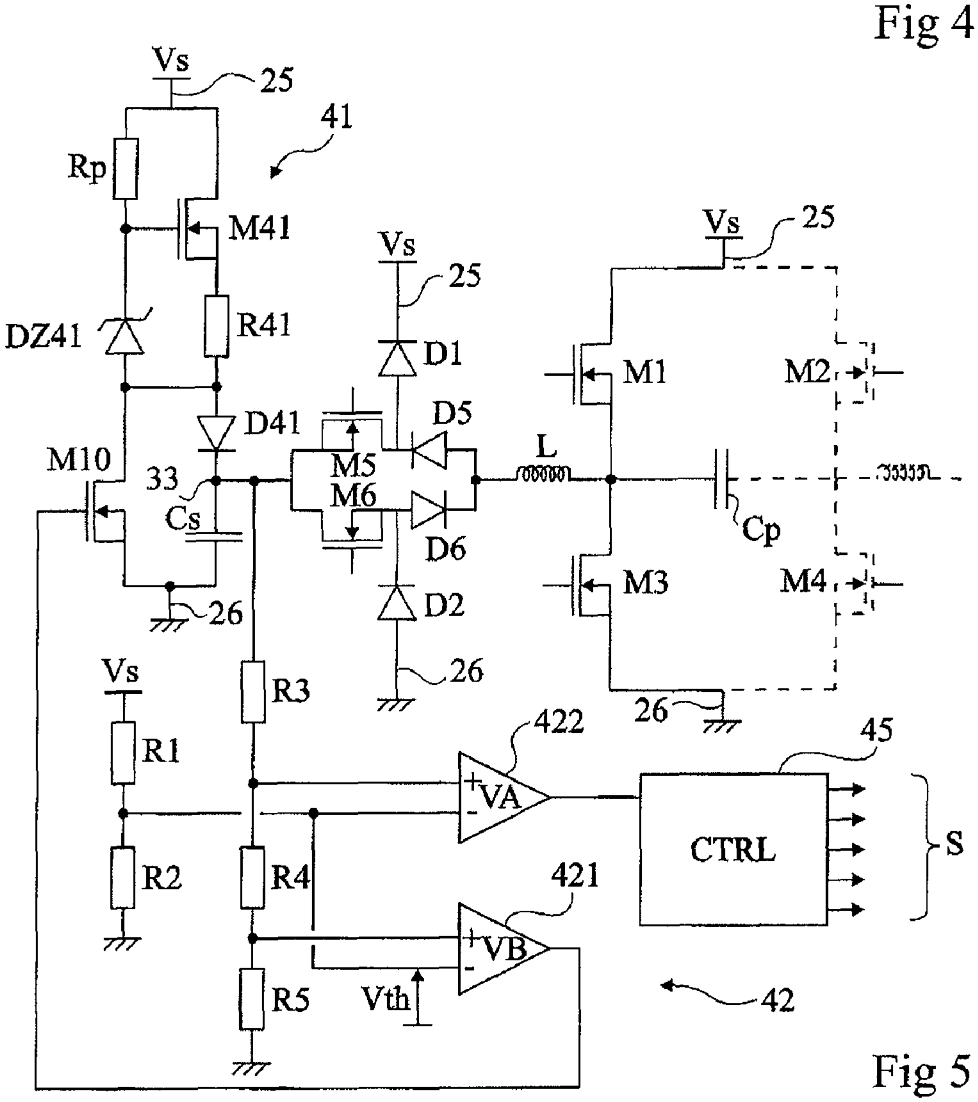
FIG. 5 is a detailed electric diagram of an embodiment of the power recovery circuit of FIG. 4.

FIG. 5 shows an example of a detailed diagram of a power recovery stage of a plasma display panel according to the present invention. The different switches have been shown in the form of MOS transistors, conversely to the previous drawings.

According to this embodiment, controllable current source 41 is formed of a transistor M41 is series with a resistor R41 between terminal 25 and the anode of a diode D41 having its cathode connected to electrode 33 of capacitor Cs. A biasing resistor Rp connects the gate of transistor M41 to terminal 25 and a zener diode DZ41 connects this gate to the anode of diode D41 (the anode of diode DZ41 being connected to the anode of diode D41). Such a current source structure is conventional. Source 41 is made controllable by means of a switch (MOS transistor M10) connecting the anode of diodes DZ41 and D41 to ground 26. When transistor M10 is blocked, source 41 charges capacitor Cs. When transistor M10 is on, the current source is grounded. Diode DZ41 sets the value of the current by limiting the voltage across its resistive elements. Further, it limits the gate-source voltage of transistor M10. Other controllable current source structures can be envisaged.

The gate of transistor M10 is connected to the output of a first comparator 421 of circuit 42 having the function of comparing a voltage proportional to voltage Vcs across capacitor Cs with a threshold VB. Threshold Vth of comparator 421 is set, for example, by a resistive bridge formed of two resistors R1 and R2 supplied in series by voltage Vs. Threshold voltage Vth is applied, for example, to the inverting input of comparator 421, the non-inverting input of which receives a voltage representative of the voltage across capacitor Cs, obtained by a second resistive bridge formed of three resistors R3, R4, and R5 in series between terminal 33 and the ground. The non-inverting input of comparator 421 is connected to the junction points of resistors R4 and R5. The output of comparator 421 is connected to the gate of transistor M10 (possibly via circuit 45). Resistors R1 to R5 set a threshold VB=VsR2(R3+R4+R5)/(R2+R1)R5 for voltage Vcs.

A second comparator 422 of circuit 42 compares voltage Vth provided by bridge R1-R2 with second data representative of the voltage across capacitor Cs different from the first one. This second voltage is taken at the junction point of resistors R3 and R4 connected to the non-inverting input of comparator 422 having its inverting input connected to the junction point of resistors R1 and R2. In fact, this amounts to comparing voltage Vcs with a threshold VA (=VsR2(R3+R4+

R5)/(R5+R4)(R2+R1)) lower than threshold VB. The output of comparator 422 is connected to switch control circuit 45.

The function of the two thresholds is to distinguish the activation of the power recovery circuit (transistors M5, M6 and H bridge formed of transistors M1, M3 and M2, M4 shown in dotted lines) from the activation or deactivation of current source 41 by the control of transistor M10.

In FIG. 5, blocking diodes D1 and D2 have been shown between transistors M5, respectively M6 and diode D5, respectively D6.

FIG. 6 illustrates, in a timing diagram showing voltage Vcs across capacitor Cs along time, the operation of the circuit of FIG. 5. Initially (time t0), capacitor Cs is discharged. Circuit 42 provides, on the one hand, a signal of blocking of transistor M10 by comparator 421, while comparator 422 notifies block 45 that voltage Vcs is smaller than first threshold VA so that switches M5, M6, M1, and M3 are all off. Voltage Vcs across the capacitor increases substantially linearly due to the charge by means of current source 41. At a time t1 when voltage level Vcs reaches threshold VA, comparator 422 switches and control block 45 activates the power recovery phase. Current source 41 is not inhibited yet, whereby the voltage across capacitor Cs keeps on increasing.

Preferably, threshold VA is selected so that latching voltage VRM of diodes D5 and D6 is smaller than level Vs-VA plus the overvoltages linked to switchings.

At a time t2 when threshold VB is reached by voltage Vcs, comparator 421 turns on transistor M10, which removes the charge of capacitor Cs by current source 41. Since the operation of the power recovery circuit has started at time t1, the increase in voltage Vcs to level Vs/2 (time t3) is carried on by the resonant circuits.

Preferably, the difference between threshold VB and level Vs/2 is selected according to the manufacturing tolerances of the different components and especially to technological dispersions on manufacturing of the resistors of the dividing bridges and of the transistors. Threshold VB must be sufficiently lower than value Vs/2 so as not to be crossed in case of a technological dispersion between components. This tolerance range Tol is illustrated in FIG. 6 by dotted lines. With such notations, VB<Vs/2−Tol/2.

FIGS. 7A to 7K illustrate the operation of a power recovery stage once the precharge of capacitor Cs has been obtained. These timing diagrams respectively illustrate examples of shapes of the control signals (on or off stage) of transistors M1, M2, M3, M4, M5, M6, M7, M8, and M10 (and M10') as well as the corresponding shapes of voltage Vp across equivalent capacitor Cp of the plasma display panel and of currents IL and IL' in the inductances of the power recovery stages.

The precharge illustrated in FIG. 6 occurs before time t1 of activation of the stage at which, for example, transistor M6 (FIG. 7F) is switched on, transistor M4 (FIG. 7D) being already on, and transistor M10 remaining off until time t2 (threshold VA) slightly subsequent to time t1. From time t1, the current (FIG. 7K) in inductive element L charges equivalent capacitor Cp (voltage Vp, FIG. 7J) to reach a voltage Vs (neglecting the voltage drops in the on components) at a time t4. At this time t4, diode D5 blocks, and an latching phenomenon which causes a current increase in inductance L can be observed. This power is carried off by diodes D6 and D2 for a time period (Δt, FIG. 7K) which is set by the voltage across the inductance. Time period Δt must of course be shorter than interval t5−t4. The blocking of transistor M6 is illustrated at time t4, knowing that its control can be slightly delayed due to the automatic blocking of diode D5. Transistor M1 (FIG. 7A) is turned on from time t4. Towards the end of the power recovery phase, transistor M5 is turned on at a time t5 (FIG. 7E) at the same time as (or slightly after) transistor M1 is turned off. An operation of the resonant circuit in the other direction by a discharge of capacitor Cp until a time t6 when the disappearing of current IL in inductance L blocks diode D6 and a latching phenomenon opposite to that of diode D5 can then be observed. Transistors M4 and M5 are turned off from time t6 and transistor M3 (FIG. 7C) is turned on at this time t6 (in practice, slightly after the turning off of transistor M4).

From time t0', the operation described hereabove in relation with the power recovery stage on the scan electrode side is reproduced on the power recovery stage on the sustain electrode side by the second branch of the H bridge. This operation is illustrated in the right-hand portion of the timing diagrams of FIGS. 7A to 7K (times t0', t1', t2', t4', t5', and t6').

If, between time t6 and start t0' of the power recovery phase on the sustain electrode side, the voltage across capacitor Cs drops too much, a new precharge of said capacitor by current source 41 can be observed.

An advantage of the present invention is that the voltage seen by transistors M5 and M6 is now limited to half the supply voltage (plus the switching overvoltages).

Another advantage of the present invention is that in case of a dissymmetry due to the impedance difference between switches M5, M6, this dissymmetry is compensated for by the precharge system.

Another advantage of the present invention is that the thresholds adapt to possible variations of supply voltage Vs.

Figure 8:
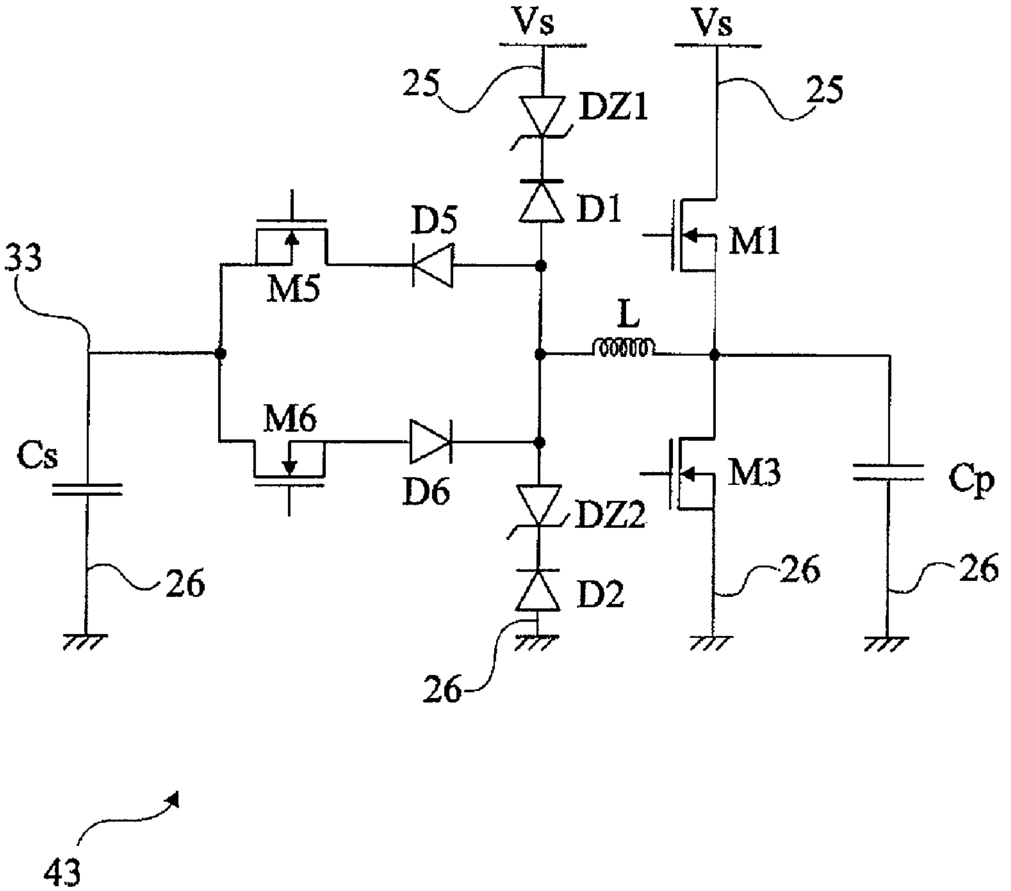
FIG. 8 shows a variation of a power recovery circuit according to the second aspect of the present invention.

FIG. 8 shows an embodiment of a power recovery stage 43 according to a second aspect of the present invention. For simplification, the precharge elements of capacitor Cs at point 33 have not been shown.

The same structure as in the previous power recovery stages can be found.

According to this aspect of the present invention, a first zener diode DZ1 is interposed between blocking diode D1 (having its anode connected to the anode of diode D5) and terminal 25 of application of supply voltage Vs. A second zener diode DZ2 is interposed between the cathode of diode D6 and that of blocking diode D2 connected to ground 26.

The function of zener diodes DZ1 and DZ2 is to set a blocking voltage greater than that brought by diodes D1 and D2.

Conversely to the circuit of FIG. 5 where the current flow in the latching phase (after time t6, FIGS. 7A to 7K) runs (for negative phases) through diode D6, inductance L, transistor M3, and diode D2, this current is according to the embodiment of FIG. 8 looped back by diode D2 and diode DZ2 without running through diode D6.

The same operation occurs in positive phases through diode DZ1.

An advantage of setting the blocking voltage by means of a zener diode DZ1 or DZ2 is that this enables decreasing time Δt of evacuation of the power stored in inductance L after the respective blockings of diodes D5 and D6. This advantage is particularly substantial with the increase in display panel operating frequencies, which decreases the available intervals.

Of course, the present invention is likely to have various alterations, modifications, and improvements which will readily occur to those skilled in the art. For example, the switches described as being MOS transistors may be replaced with insulated-gate bipolar transistors (IGBT). Further, the dimensions to be given to the different components of the starting circuit of the present invention are within the abilities of those skilled in the art based on the functional indications given hereabove. Further, the adaptation of the generally digital control circuits of the plasma display panel to take into account the thresholds detected by the present invention is also within the abilities of those skilled in the art by using conventional tools.

The invention claimed is:

1. A method for controlling a power recovery stage of a plasma display panel comprising a resonant circuit of at least one inductive element and one capacitive element, said method comprising at least one step of precharge of the capacitive element to half a supply voltage of the display panel, by a controllable current source, wherein a first terminal of the capacitive element is connectable through switches to a non-panel side of the inductive element and wherein the current source is connected between a supply voltage terminal and the first terminal of the capacitive element, wherein the switches connecting the capacitive element to the inductive element are turned off and current does not flow through the inductive element during at least part of the precharge of the capacitive element by the current source, so that the capacitive element is precharged by the current source without current flow through the inductive element at least until a voltage across the capacitive element has reached a first threshold depending on the supply voltage.

2. The method of claim 1, wherein the step of precharge of the capacitive element is inhibited when the voltage thereacross reaches a second threshold depending on the supply voltage, greater than the first threshold.

3. A control circuit of a power recovery stage of a plasma display panel having a resonant circuit of at least one inductive element and at least one capacitive element, comprising:

a controllable current source coupled between a terminal of application of a supply voltage and the capacitive element, wherein the capacitive element is connectable through switches to a non-panel side of the inductive element; and at least one comparator for comparing the voltage across the capacitive element with respect to a first threshold to activate switching elements of the recovery circuit, wherein the switches connecting the capacitive element to the inductive element are turned off and current does not flow through the inductive element during at least part of the precharge of the capacitive element by the controllable current source, so that the capacitive element is precharged by the controllable current source without current flow through the inductive element at least until a voltage across the capacitive element has reached the first threshold.

4. The circuit of claim 3, wherein another comparator compares the voltage across the capacitive element with respect to a second threshold greater than the first threshold to control said current source.

5. A power recovery stage of a plasma display panel comprising a resonant circuit of at least one capacitor in series with a bi-directional switch and at least one inductive element between the junction point of a first branch of an H bridge and the ground, said junction point being connected to first electrodes of the display panel and the bi-directional switch being formed of an antiparallel association of two switches, each in series with a diode, comprising the circuit of claim 3.

6. The stage of claim 5, comprising two blocking circuits each comprising a zener diode in series with a diode between the terminal of the inductance connected to the bi-directional switch and two terminals of application of the supply voltage.

7. A plasma display panel comprising at least one power recovery stage of claim 5.

8. A circuit for controlling a power recovery stage of a plasma display panel having a resonant circuit including an inductive element and a capacitive element, comprising:

a controllable current source configured to supply a controllable current to the capacitive element, the capacitive element being connected through switches to a non-panel side of the inductive element; and a control circuit configured to control the current source to supply current to the capacitive element, when precharge of the capacitive element is required, wherein the switches connecting the capacitive element to the inductive element are turned off and current does not flow through the inductive element during at least part of the precharge of the capacitive element by the controllable current source, so that the capacitive element is precharged by the controllable current source without current flow through the inductive element at least until a voltage across the capacitive element has reached a first threshold.

9. A circuit as defined in claim 8, wherein the current source includes a first terminal coupled to a supply voltage and a second terminal coupled to the capacitive element.

10. A circuit as defined in claim 8, wherein the control circuit includes a comparator configured to compare the voltage on the capacitive element with a second threshold and to disable the current source when the voltage on the capacitive element reaches the second threshold.

11. A circuit as defined in claim 10, wherein the control circuit further includes another comparator to compare the voltage on the capacitive element with the first threshold and to activate or deactivate the power recovery stage in response to a result of the comparison.

12. A circuit as defined in claim 8, further comprising a power recovery stage including a resonant circuit of at least one capacitor in series with a bi-directional switch and at least one inductive element between a junction point of a first branch of an H bridge and ground, the junction point being connected to first electrodes of the plasma display panel, the bi-directional switch including an antiparallel connection of two switches, each in series with a diode.

13. A circuit as defined in claim 12, wherein the power recovery stage comprises two blocking circuits, each including a zener diode in series with a diode, connected between a terminal of the inductance connected to the bi-directional switch and supply voltage terminals.

14. A method for controlling a power recovery stage of a plasma display panel having a resonant circuit including an inductive element and a capacitive element, comprising:

supplying, by a controllable current source, a controllable current to the capacitive element when the current source is enabled, the capacitive element being connected through switches to a non-panel side of the inductive element; and controlling, by a control circuit, the current source to supply current to the capacitive element, when precharge of the capacitive element is required, wherein the switches connecting the capacitive element to the inductive element are turned off and current does not flow through the inductive element during at least part of the precharge of the capacitive element by the current source, so that the capacitive element is precharged by the current source without current flow through the inductive element at least until a voltage across the capacitive element has reached a first threshold depending on the supply voltage.

15. A method as defined in claim 14, wherein supplying a controllable current comprises supplying a controllable current from a power supply.

16. A method as defined in claim 14, wherein controlling the current source comprises comparing the voltage on the capacitive element with a second threshold and enabling or disabling the current source based on a result of the comparison.

17. A method as defined in claim 16, further comprising comparing the voltage on the capacitive element with the first threshold and activating or deactivating the power recovery stage based on a result of the comparison.

* * * * *